United States Patent [19]

Chi

[11] Patent Number: 5,615,585

[45] Date of Patent: Apr. 1, 1997

[54] ANTI-TANGLE MECHANISM FOR A BICYCLE

[76] Inventor: Yi Chen Chi, No. 139-5, An Mei Rd. Mei Shan Tsun, Hou Li Hsiang, Taichung Hsien, Taiwan

[21] Appl. No.: 563,308

[22] Filed: Nov. 28, 1995

[51] Int. Cl.[6] ............................... F16C 1/10; B62K 21/18
[52] U.S. Cl. ..................... 74/551.1; 74/99 A; 180/24.1; 188/24.22; 280/279
[58] Field of Search ............................... 74/551.1, 551.2, 74/551.3, 567, 569, 99 A; 280/279, 280, 264, 278; 192/93 A; 180/24.11; 188/24.12, 24.22

[56] References Cited

U.S. PATENT DOCUMENTS

| | | | |
|---|---|---|---|
| 4,616,523 | 10/1986 | Jones | 280/279 X |
| 4,653,768 | 3/1987 | Keys et al. | 74/551.1 X |
| 4,770,435 | 9/1988 | Cristie | 74/551.2 X |

*Primary Examiner*—Charles A. Marmor
*Assistant Examiner*—Saul Rodriguez
*Attorney, Agent, or Firm*—Morton J. Rosenberg; David I. Klein

[57] ABSTRACT

An anti-tangle mechanism includes a first ring element with first tooth elements and a second ring element with second tooth elements which engage with the first tooth elements, a plurality of balls disposed to a top of the first element and an under side of the second ring element, a cap having a first tubular portion for the first ring element mounted thereto and a first flange in which a first groove is defined for receiving the balls of the first ring element, a base having a second tubular portion for the second ring element mounted thereto and a second flange in which a second groove is defined for receiving the balls of the second ring element, the first ring element having a first fixing element extending laterally therefrom for a rear brake cable sheath engaged thereto and the second ring element having a second fixing element extending therefrom for fixedly engaging a distal end of the rear brake cable, an active cable having one end extending through the second tubular portion and being fixed to the first tubular portion, the other end of the active cable connected to a rear wheel brake device of the bicycle, the mechanism mounted to an upper bearing set such that the mechanism can be continuously rotated without winding the rear brake cable.

4 Claims, 6 Drawing Sheets

ANTI-TANGLE MECHANISM FOR A BICYCLE

BACKGROUND OF THE INVENTION

The present invention relates to an anti-tangle mechanism for a bicycle and more particularly to an anti-tangle mechanism disposed to a steering stem of a bicycle so as to prevent a rear brake cable from being tangled with the steering stem.

Generally, a bicycle has a front brake means disposed to a front wheel of the bicycle and a rear brake device disposed to a rear wheel of the bicycle, both of the two brake means are operated by cables connected a respective lever disposed to a handlebar such that a rider pulls the respective lever may stop the bicycle wherein the front brake cable is inserted through the hollow steering stem and extends out from the front fork so as to connected the front brake mechanism and the rear brake cable extends from the lever and is arranged along the steering stem to the rear brake device. However, there are some bicycles called "Freestyle BMX" bicycles which allow the handlebars to be rotated continuously without winding the rear brake cable around the steering stem.

The present invention intends to provide an anti-tangle mechanism which enables the cable tangling to be avoided at all times regardless of rotational requirements of the handlebars about an axis of the steering stem.

SUMMARY OF THE INVENTION

The present invention provides a anti-tangle mechanism which mounted an upper bearing set of a bicycle and includes a first ring element with first tooth elements and a second ring element with second tooth elements which engage with the first tooth elements, a plurality of rollers disposed to a top of the first element and an under side of the second ring element. A cap has a first tubular portion for the first ring element mounted thereto and a first flange in which a first groove is defined for receiving the rollers of the first ring element. A base has a second tubular portion for the second ring element mounted thereto and a second flange in which a second groove is defined for receiving the rollers of the second ring element. The first ring element has a first fixing element extending laterally therefrom for a rear brake cable sheath engaged thereto and the second ring element has a second fixing element extending therefrom for securely engaging a distal end of the rear brake cable. An active cable has one end extending through the second tubular portion and being fixed to the first tubular portion, the other end of the active cable connected to a rear wheel brake device of the bicycle.

The mechanism can be continuously rotated with the handlebar without winding the rear brake cable and when the rear brake cable is pulled, the distance between the two fixing element is shortened and a distance between the first and the second ring elements is increased so as to actuate the rear brake cable.

It is an object of the present invention to provide an anti-tangle mechanism which provides a feature of rotating the handlebar with winding the rear brake cable.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
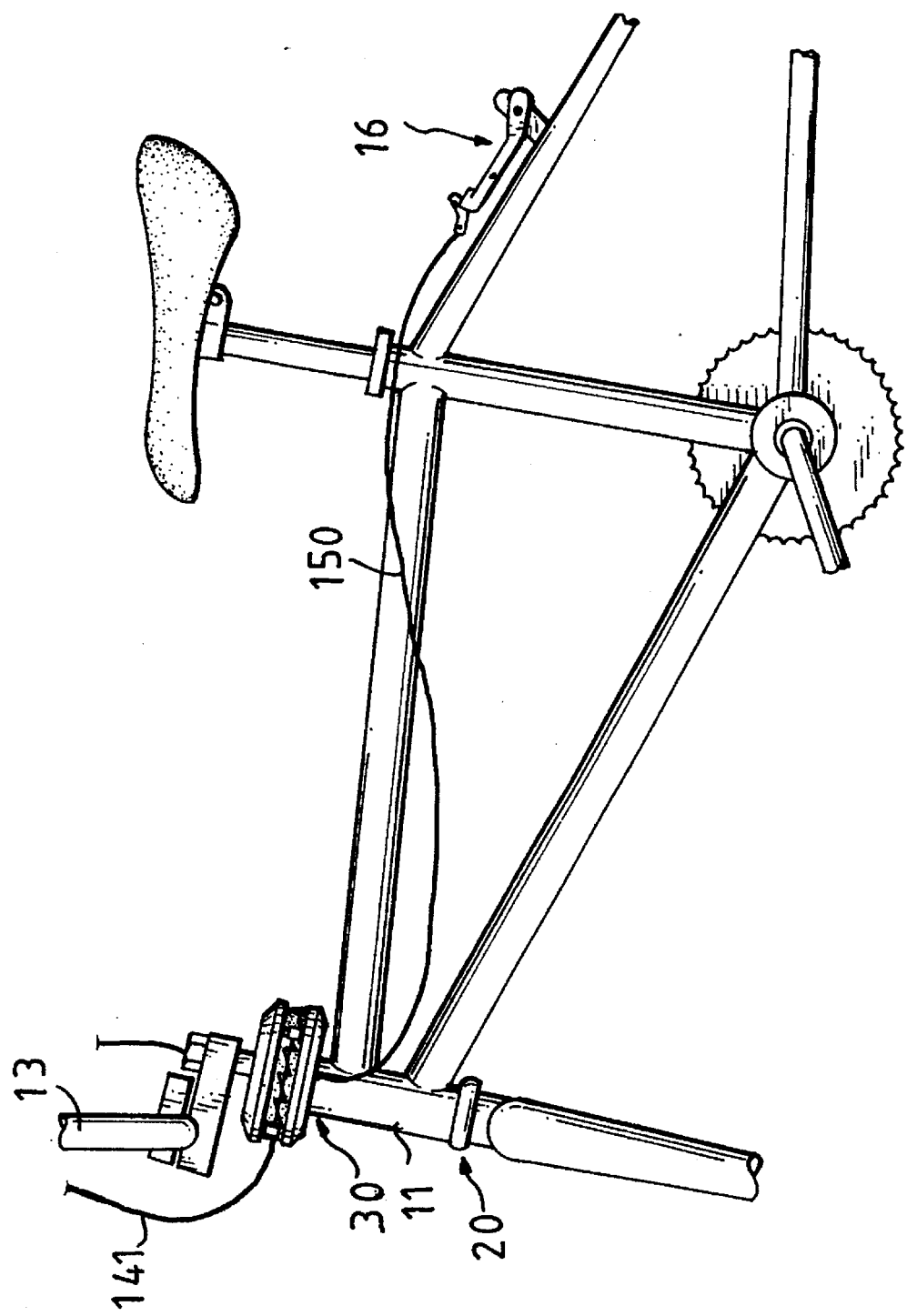
FIG. 1 is a side elevational view of a bicycle equipped with the anti-tangle mechanism in accordance with the present invention.
Figure 2:
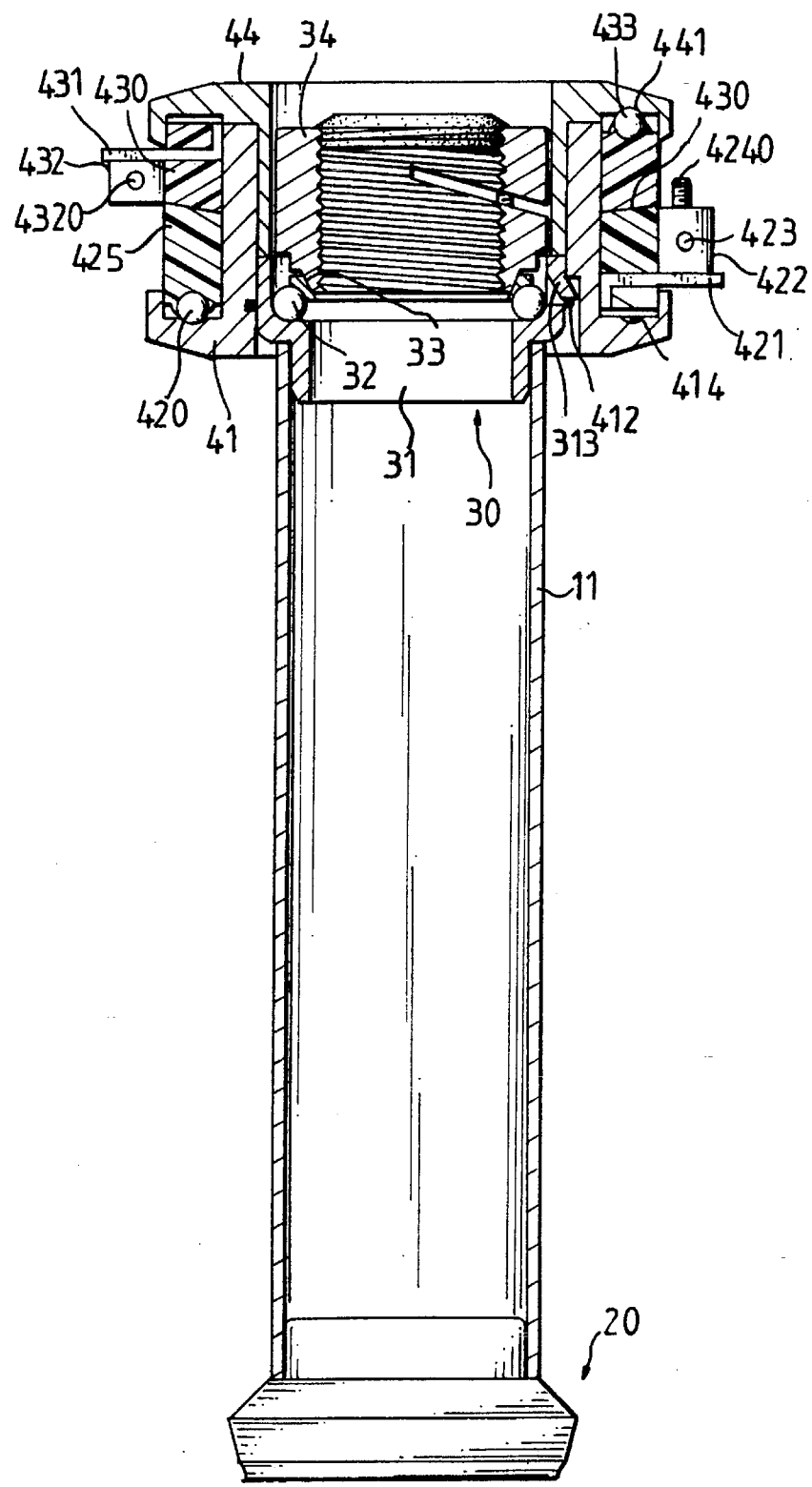
FIG. 2 is a side elevational view, partly in section, of the mechanism disposed to an upper bearing set which is disposed to a head tube.
Figure 3:
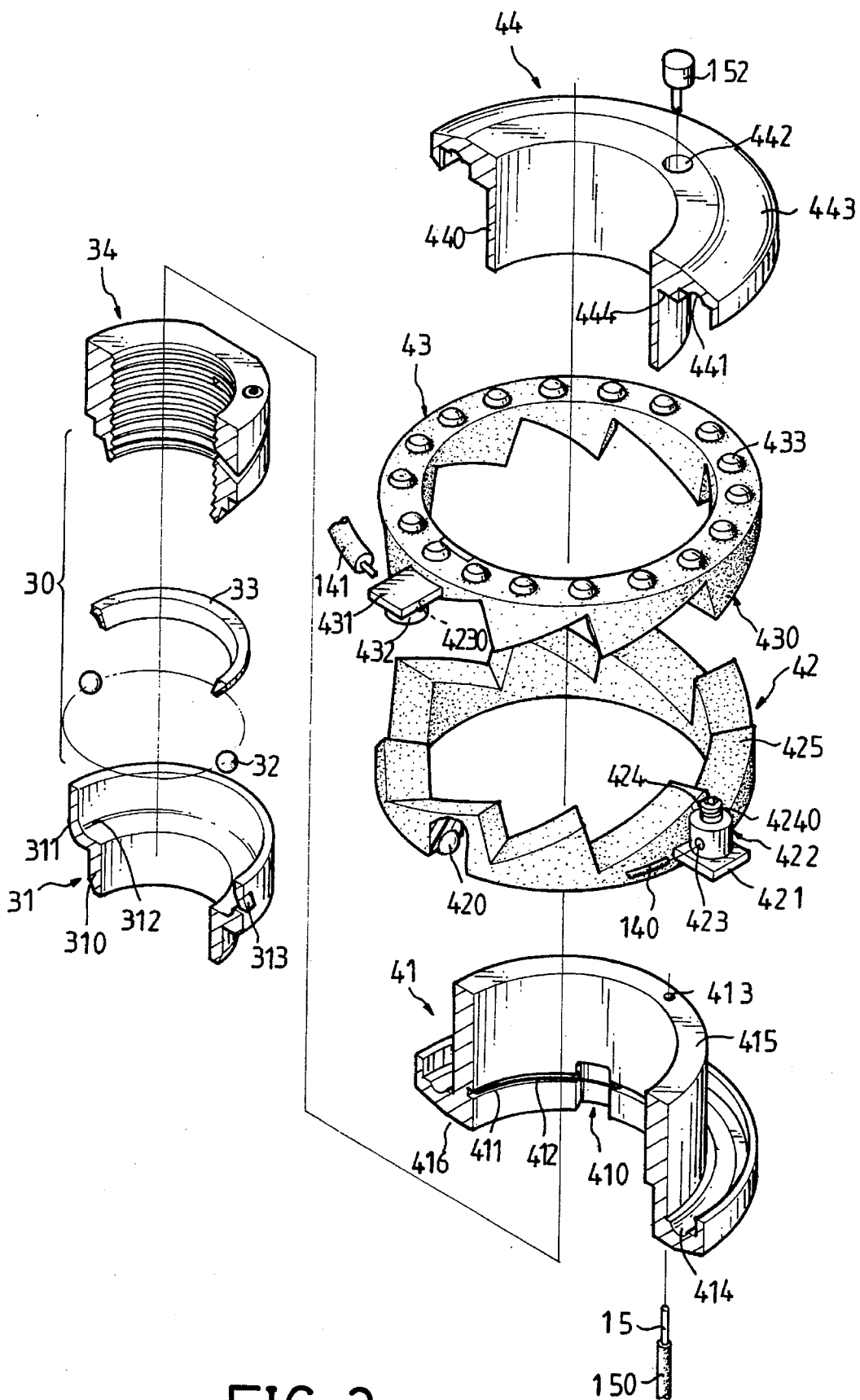
FIG. 3 is an exploded view of the mechanism in accordance with the present invention.

Referring to the drawings and initially to FIGS. 1 through 3, a bicycle has a head tube 11 which has a first end and a second end, the first end of the head tube 11 having an upper bearing set 30 (FIG. 2) disposed thereto and the second end of the head tube 11 having a lower bearing set 20 disposed thereto such that a steer tube (not shown) is rotatably inserted therethrough. The upper bearing set 30 including a bowl 31, a plurality of balls 32, a race 33 and a compression element 34, the bowl 31 having a neck portion 310 and a skirt portion 311, the skirt portion 311 extending from the neck portion 310 and having a groove 312 defined in an upper portion thereof, the neck portion 310 being inserted into the first end of the head tube 11 and the balls 32 being rotatably received in the groove 312 of the skirt portion 311 wherein the skirt portion 311 has at least one protrusion 313 extending radially therefrom, the race 33 disposed on the bails 32 and the compression element 34 disposed to the race 33 to position the balls 32.

The anti-tangle mechanism in accordance with the present invention comprises a first ring element 43, the first ring element 43 having a plurality of rotatable elements such as first balls 433 rotatably disposed to a top thereof and a plurality of first tooth elements 430 extending downwardly from an under side thereof. A first board 431 extends laterally from one of the first tooth elements 430 and has a first fixing element 432 disposed to an under side of the first board 431, the first fixing element 432 having first hole 4320 defined radially therein for a rear brake cable 140 extending through the first hole 4320 and a sheath 141 of the rear brake cable 140 engaged against the first fixing element 432.

A cap 44 has a first tubular portion 440 and a first flange 443, the first flange 443 extending radially from a periphery of the first tubular portion 440, the first flange 443 having a shoulder portion 444 defined in an under side of the first flange 443 and the shoulder portion 444 near the first tubular portion 440. A first groove 441 is defined in the under side of the first flange 443 and is located next to the shoulder portion 444 in a radial direction for receiving the first balls 433 in the first groove 441, a first cable hole 442 defined longitudinally in the shoulder portion 444.

A second ring element 42, the second ring element 42 has a plurality of second tooth elements 425 extending upwardly from a top thereof for being engaged with the first tooth elements 430 and a plurality of second balls 420 rotatably disposed to an under side of the second ring element 42. A second board 421 extends laterally from one of the second tooth elements 425 and has a second fixing element 422 disposed to an upper side of the second board 421. The second fixing element 422 has a second hole 423 defined radially therethrough and has a fixing means disposed thereto which includes a threaded recess 424 defined in a top of the fixing element 422, the threaded recess 424 communicating with the second hole 423 of the second fixing element 422 such that a distal end of the rear brake cable 140 is inserted into the second hole 423 and is securely engaged to the second fixing element 422 by threadedly engaging a threaded rod 4240 in the threaded recess 424.

A base 41 has a second tubular portion 415 and a second flange 416 which extends radially from the second tubular portion 415, the second tubular portion 415 having at least one recess 410 defined in an inner periphery thereof. The second flange 416 has a second groove 414 defined in a top thereof for receiving the second balls 420 therein, a second cable hole 413 defined longitudinally in the second tubular portion 415 and in alignment with the first cable hole 442 of the cap 44 for an active cable 15 inserting through the second cable hole 413 and the first cable hole 442 wherein a sheath 150 of the active cable 15 is engaged against the base 41, one end of the active cable extending from the first cable hole 442 being engaged to a cable block 152 which is fixedly received with the first cable hole 442 and the other end of the active cable 15 connected to a rear wheel brake device 16 as shown in FIG. 1.

The first ring element 43 and the second ring element 42 are mounted to the second tubular portion 415 of the base 41 first and the first tubular portion 440 of the cap 44 inserting into the inner periphery of the second tubular portion 415 such that a top of the second tubular portion 415 contacts the shoulder portion 444 of the cap 44 and the first tooth elements 430 engages to the second tooth elements 425. The base 41 has a third groove 411 defined radially in the inner periphery of the second tubular portion 415 and the third groove 411 communicates with the recess 410 so as to dispose a resilient ring 412 in the third groove 411. The bowl 31 is received in the second tubular portion 415 so as to engage the protrusion 313 with the recess 410 and the resilient ring 412 is then deformed by the protrusion 313 so as to position the base 41.

Figure 4:
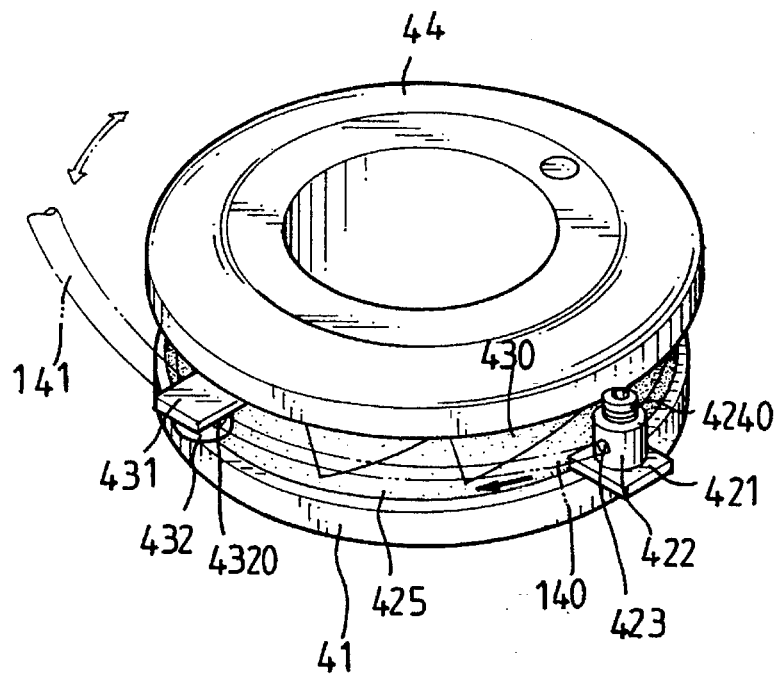
FIG. 4 is a perspective view of the mechanism wherein a rear brake cable and a sheath of the cable are shown in phantom lines.
Figure 5:
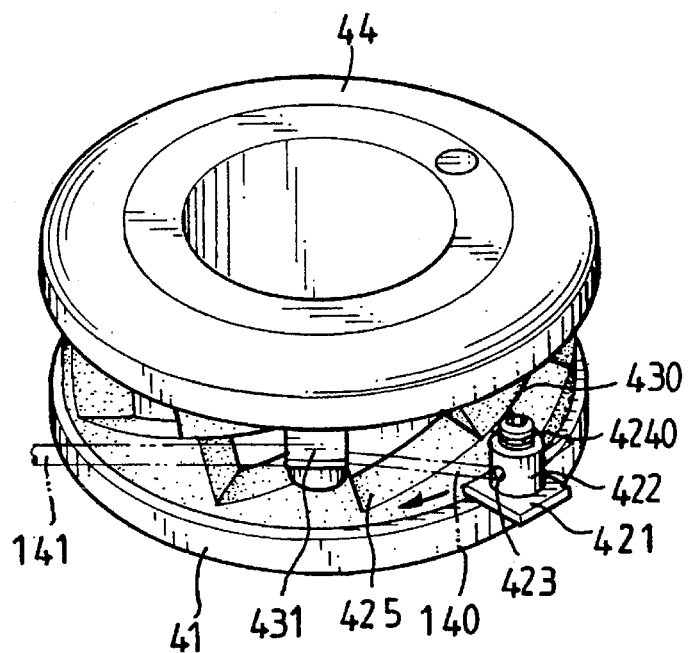
FIG. 5 is a perspective view of the mechanism wherein the cable is pulled such that the distance between the two ring elements of the mechanism is increased.

Accordingly, referring FIGS. 4 and 5, when rotating a handlebar 13 (FIG. 1) of the bicycle, the combination of the first and the second ring elements 43, 42, the cap 44 and the base 41 is rotated with the handlebar without winding the rear brake cable 140 around a handlebar stem thereof. When pulling a lever (not shown) connected to the rear brake cable 140, the second ring element 42 is pulled to rotate about an axis of the second tubular portion 415 thus shortens a distance between the first fixing element 432 and the second fixing element 422 and the second tooth elements 425 slides along the first tooth elements 430 to increase a distance between the first ring element 43 and the second ring element 42 as shown in FIG. 5. Under such an action, the active cable 15 is pulled to actuate the rear wheel brake device 16 to stop a rear wheel (not shown).

Figure 6:
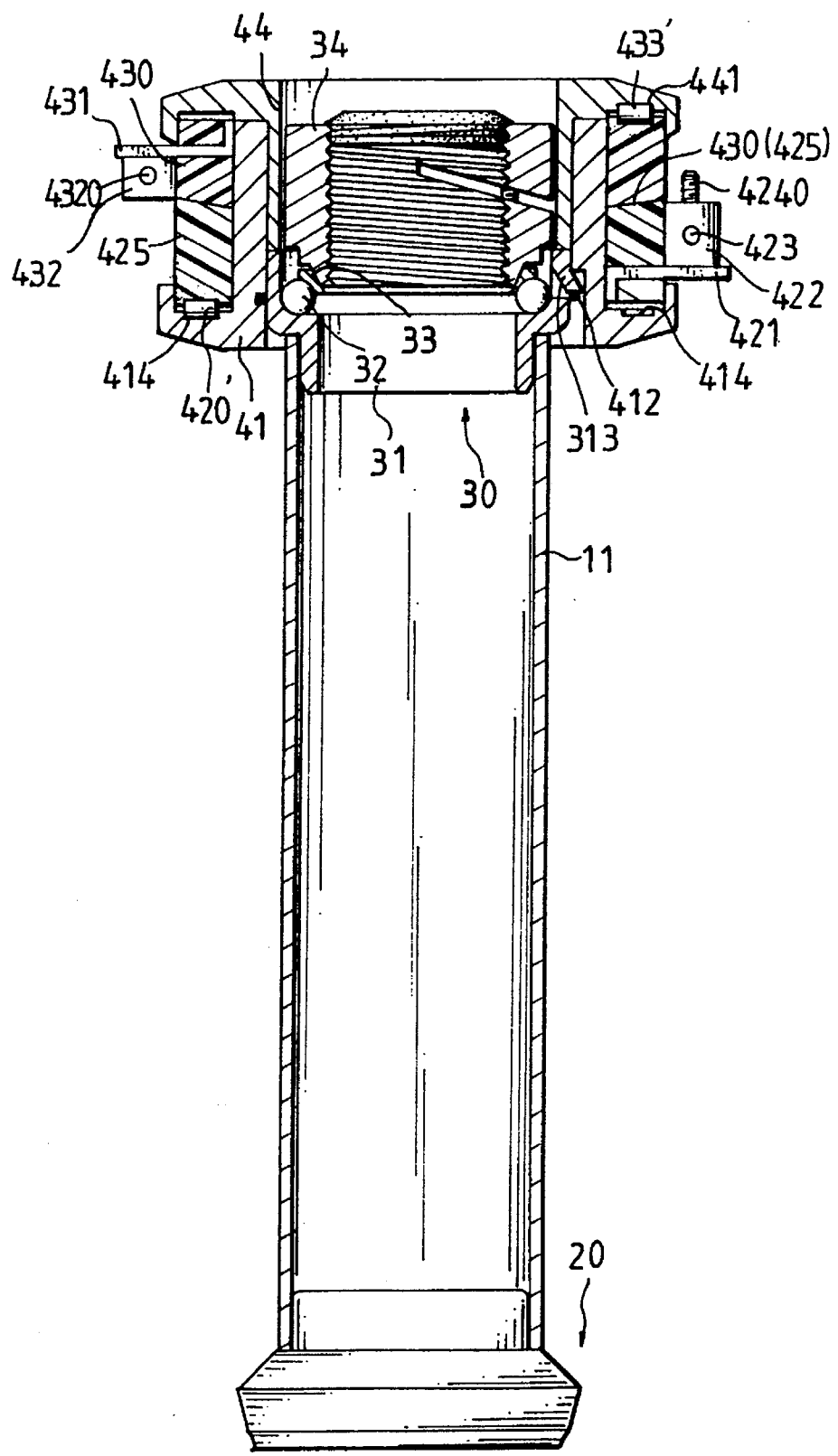
FIG. 6 is a side elevational view, partly in section, of another embodiment of the mechanism disposed to an upper bearing set which is disposed to a head tube.

Referring to FIG. 6, the first balls 433 and the second balls 420 can be replaced by first rollers 433' and 420'.

Figure 7:
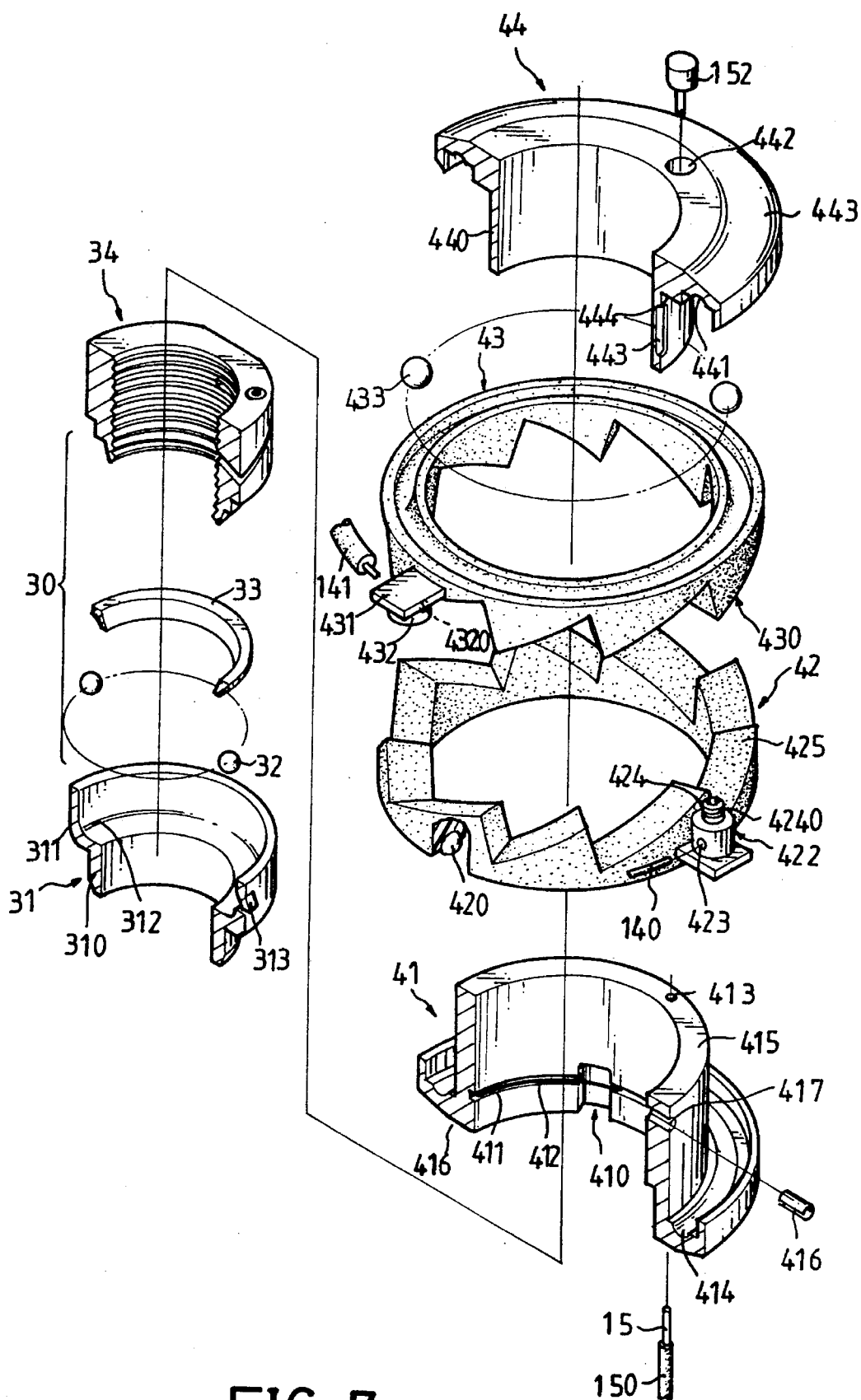
FIG. 7 is an exploded view of yet another embodiment of the mechanism in accordance with the present invention.

Referring to FIG. 7, the first tubular portion 440 has a slot 443 defined longitudinally therein and the second tubular portion 415 has a third hole 417 defined therein for a pin 416 inserted into the slot 443 and the third hole 417 so as to limit the distance between the cap 44 and the base 40 when pulling the rear brake cable 140.

Although the invention has been explained in relation to its preferred embodiment, it is to be understood that many other possible modifications and variations can be made without departing from the spirit and scope of the invention as hereinafter claimed.

What is claimed is:

1. An anti-tangle mechanism for a bicycle comprising a bicycle having a head tube which has a first end and a second end, said first end of said head tube having an upper bearing set disposed thereto and said second end of said head tube having a lower bearing set disposed thereto, said upper bearing set including a bowl, a plurality of balls, a race and a compression element, said bowl having a neck portion and a skirt portion, said skirt portion extending from said neck portion and having a groove defined in an upper portion thereof, said neck portion being inserted into said first end of said head tube and said balls being rotatably received in said groove of said skirt portion, said race disposed on said balls and said compression element disposed to said race to position said balls, said mechanism comprising:

a first ring element, said first ring element having a plurality of rotatable elements rotatably disposed to a top thereof and a plurality of first tooth elements extending downwardly from an under side thereof, a first board extending laterally from one of said first tooth elements and having a first fixing element disposed to an under side of said first board, said first fixing element having first hole defined radially in said first fixing element for a rear brake cable extending through said first hole and a sheath of said rear brake cable engaged against said first fixing element;

a cap having a first tubular portion and a first flange, said first flange extending radially from a periphery of said first tubular portion, said first flange having a shoulder portion defined in an under side of said first flange and said shoulder portion near said first tubular portion, a first groove defined in said under side of said first flange and located next to said shoulder portion in a radial direction for receiving said first rotatable elements in said first groove, a first cable hole defined longitudinally in said shoulder portion;

a second ring element, said second ring element having a plurality of second tooth elements extending upwardly from a top thereof for being engaged to said first tooth elements and a plurality of rotatable elements rotatably disposed to an under side of said second ring element, a second board extending laterally from one of said second tooth elements and having a second fixing element disposed to an upper side of said second board, said second fixing element having second hole defined radially in said second fixing element for a distal end of said rear brake cable inserted therein, said second fixing element having a fixing means disposed thereto for fixedly engaging said distal end of said rear brake cable in said second fixing element;

a base having a second tubular portion and a second flange, said second tubular portion having at least one recess defined in an inner periphery thereof, said second flange extending radially from a periphery of said second tubular portion, said second flange having a second groove defined in a top thereof for receiving said second rotatable elements therein, a second cable hole defined longitudinally in said second tubular portion and in alignment with said first cable hole of said cap for an active cable inserting through said second cable hole and said first cable hole, a distal end of said active cable extending from said first cable hole being engaged to a cable block which is fixedly received in said first cable hole and the other end of said active cable engaged to a rear wheel brake device of said bicycle;

said bowl of said upper bearing set having at least one protrusion extending radially from said skirt portion of said bowl;

said first ring element and said second ring element mounted to said second tubular portion of said base and said first tubular portion of said cap inserting into said inner periphery of said second tubular portion, a top of said second tubular portion contacting said shoulder portion of said cap and said first tooth elements engaging to said second tooth elements, said bowl being received in said second tubular portion so as to engage said protrusion with said recess to position said base.

2. The mechanism as claimed in claim 1 wherein said base has a third groove defined radially in said inner periphery of said second tubular portion and communicating with said recess so as to dispose a resilient ring in said third groove.

3. The mechanism as claimed in claim 1 wherein said first tubular portion has a slot defined longitudinally therein and said second tubular portion has a third hole defined therein for a pin inserted into said slot and said third hole.

4. The mechanism as claimed in claim 1 wherein said second fixing element includes a threaded recess defined in a top of said second fixing element, said threaded recess communicating with said second hole of said second fixing element such that said distal end of said rear brake cable is inserted into said second hole and is securely engaged to said second fixing element by threadedly engaging a threaded rod into said threaded recess.

* * * * *